(12) United States Patent (10) Patent No.: US 8,760,519 B2
Ozdemir et al. (45) Date of Patent: Jun. 24, 2014

(54) THREAT-DETECTION IN A DISTRIBUTED MULTI-CAMERA SURVEILLANCE SYSTEM

(75) Inventors: Hasan Timucin Ozdemir, Plainsboro, NJ (US); Kuo Chu Lee, Princeton Junction, NJ (US)

(73) Assignee: Panasonic Corporation, Osaka (JP)

( * ) Notice: Subject to any disclaimer, the term of this patent is extended or adjusted under 35 U.S.C. 154(b) by 2052 days.

(21) Appl. No.: 11/675,849

(22) Filed: Feb. 16, 2007

(65) Prior Publication Data

US 2008/0198231 A1 Aug. 21, 2008

(51) Int. Cl.
*H04N 7/18* (2006.01)
*G08B 13/196* (2006.01)
*H04N 5/228* (2006.01)

(52) U.S. Cl.
CPC .... *G08B 13/19608* (2013.01); *G08B 13/19645* (2013.01); *H04N 7/188* (2013.01)
USPC ........... 348/159; 348/135; 348/139; 348/142; 348/161; 348/169

(58) Field of Classification Search
CPC ................... G08B 13/19608; G08B 13/19645; H04N 7/188
USPC ........................................ 348/152–155, 159
See application file for complete search history.

(56) References Cited

U.S. PATENT DOCUMENTS

| | | | |
|---|---|---|---|
| 5,966,074 A | 10/1999 | Baxter | |
| 6,441,734 B1 | 8/2002 | Gutta et al. | |
| 6,593,852 B2 * | 7/2003 | Gutta et al. | 340/541 |
| 2001/0019357 A1 * | 9/2001 | Ito et al. | 348/152 |
| 2004/0153650 A1 * | 8/2004 | Hillmer | 713/176 |
| 2005/0073585 A1 * | 4/2005 | Ettinger et al. | 348/155 |
| 2009/0262195 A1 * | 10/2009 | Yoshida et al. | 348/159 |

OTHER PUBLICATIONS

"Scalable Surveillance Software Architecture", Henry Detmold, et al., IEEE International Conference on Video and Signal Based Surveillance (AVSS'06), 2006, 6 pages.
"Learning Semantic Scene Models by Trajectory Analysis", Xiaogang Wang, et al., Computer Science and Artificial Intelligence Laboratory, 2006, 14 pages.
"Activity Topology Estimation for Large Networks of Cameras", Anton van den Hengel, et al., Proceedings of the IEEE International Conference on Video and Signal Based Surveillance (AVSS'06), 2006, 6 pages.

(Continued)

*Primary Examiner* — Joseph Greene
(74) *Attorney, Agent, or Firm* — Harness, Dickey & Pierce, P.L.C.

(57) ABSTRACT

A method is provided for detecting a threat in a distributed multi-camera surveillance system. The method includes: monitoring movement of an object in a field of view of a first camera using software installed at the first camera; detecting a suspicious object at the first camera when movement of the object does not conform with a motion flow model residing at the first camera; sending a tracking request from the first camera to a second camera upon detecting the suspicious object at the first camera; monitoring movement of the object in a field of view of the second camera using software installed at the second camera; assigning threat scores at the second camera when the movement of the object does not conform with a motion flow model residing at the second camera; and generating an alarm based in part on the threat scores detected at the first camera and the second camera.

29 Claims, 8 Drawing Sheets

(56) References Cited

OTHER PUBLICATIONS

"Acquiring Multi-Scale Images by Pan-Tilt-Zoom Control and Automatic Multi-Camera Calibration", A.W. Senior, et al., IEEE Workshop on Application of Computer Vision (WAC/MOTION'05), 2005, 6 pages, http://www.research.ibm.com/peoplevision.

"Automated Multi-Camera Planar Tracking Correspondence Modeling", C. Stauffer, et al., IEEE Computer Society Conference on Computer Vision and Pattern Recognition (CVPR'03), 2003, 8 pages.

* cited by examiner

THREAT-DETECTION IN A DISTRIBUTED MULTI-CAMERA SURVEILLANCE SYSTEM

FIELD

The present disclosure relates to surveillance systems and, more particularly, to an automated threat detection scheme for a distributed multi-camera surveillance system.

BACKGROUND

Video surveillance is a key technology for enhanced protection of facilities such as airports and power stations. Video surveillance hardware has developed to the point where the implementation of networks having thousands of cameras is now feasible. However, constructing software that efficiently and reliably deals with networks of this size remains a problem.

A key step towards automating surveillance of video from many cameras is to generate an understanding of the paths which targets take between the field of views of different cameras. Detecting a threat based on the historical path information requires finding the correlation between the flows cross multiple cameras. Without such correlation, an abnormal threat behavior of a person visiting different surveillance zone may appear normal in each camera. This disclosure proposes to solve the problem using a novel activity topology discovery method to calculate correlation of statistical properties of object path between the entry and exit regions of the multiple cameras by using a decentralized approach in which the correspondence between cameras is carried out through message exchange. Each camera learns their source (entry) and sink (exit) regions, thereby reducing the state space. The space is further reduced by considering only the source and sink regions when determining correspondence between cameras. Learned topology information may be also used to answer alarm related queries and combine surveillance video recordings from multiple cameras into a coherent retrieval result.

Learned correlation between the object paths between cameras forms a normal activity topology information base that may be used to detect the threat level of object traveling from camera to camera. It can also be used to display highly correlated surveillance video in adjacent position to facilitate tracking a fast moving objects cross multiple cameras.

The statements in this section merely provide background information related to the present disclosure and may not constitute prior art.

SUMMARY

A method is provided for detecting a threat in a distributed multi-camera surveillance system. The method includes: monitoring movement of an object in a field of view of a first camera using software installed at the first camera; detecting a threat at the first camera when movement of the object does not conform with a motion flow model residing at the first camera; sending a tracking request from the first camera to a second camera upon detecting the threat at the first camera; monitoring movement of the object in a field of view of the second camera using software installed at the second camera; detecting an threat at the second camera when the movement of the object does not conform with a motion flow model residing at the second camera, and generating an alarm based in part on the threat detected at the first camera and the second camera.

In another aspect of this disclosure, a method is provided for learning motion flow of objects between two or more cameras in a distributed multi-camera surveillance system. The method includes: detecting an object moving in a field of view of a first camera using software installed at the first camera; sending a tracking request from the first camera across a network to other cameras in the network; searching for the object in a field of view of a second camera in response to the tracking request received from the first camera; and associating the second camera with the first camera when the object is detected in the field of view of the second camera.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
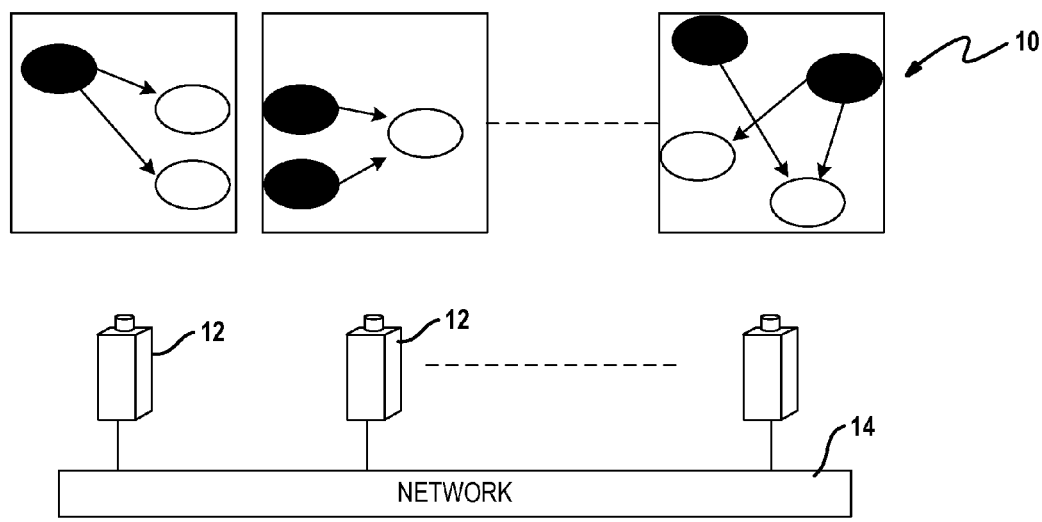
FIG. 1 is a diagram depicting a portion of a distributed multi-camera surveillance system.

FIG. 1 illustrates a portion of a distributed multi-camera surveillance system 10. This portion of the surveillance system 10 is comprised of two or more surveillance cameras 12 interconnected by a network 14. Each camera 12 is configured to capture video within a field of view of the camera and store the video in a local or remote data store associated with the camera. Each camera 12 is also equipped with computing capability sufficient to implement object detection, tracking and threat evaluation algorithms as further described below. The network 14 may be formed by wired connections, wireless connections, or a combination of both.

Figure 2:
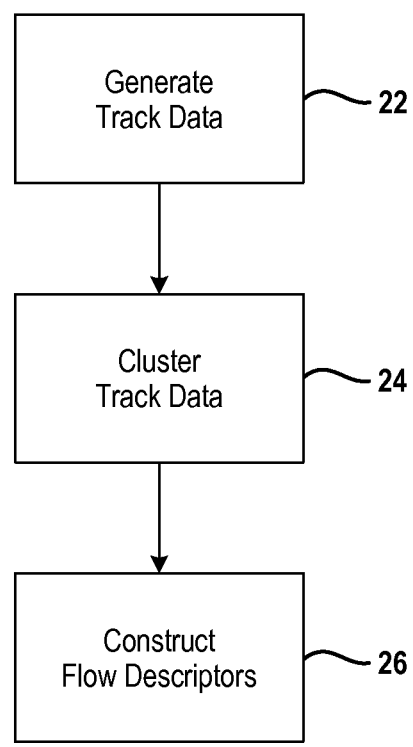
FIG. 2 is a flowchart illustrating an exemplary technique for a camera to learn the motion flow of objects in its field of view.

With reference to FIG. 2, each camera is configured to learn the motion flow of objects in its field of view and build a motion flow model (also referred to herein as flow model building algorithm). The path or track of an object moving in the field of view of the camera is generated at 22 by an object tracking algorithm. Each track is defined by an object identifier and a series of positional data (i.e., x, y coordinates) having a corresponding timestamp as is known in the art. The camera accumulates such metadata over one or more periods of time.

Flow descriptors are the directional paths of objects moving in the field of view of the camera. From the track data, the camera can build flow descriptors by using clustering. For a given period of time, a clustering algorithm is applied at 24 to the beginning points and ending points of the tracks which occur in the time period. Exemplary clustering algorithms may include but are not limited to a K-means or an expectation maximization (EM) algorithm. The clustered beginning points define entry (source) areas within the field of view of the camera; whereas the clustered ending points define exit (sink) areas within the field of view of the camera. Entry and exit areas may have temporal extend in which they are active.

Each camera assigns unique identifiers for each discovered entry region, exit region and flow, where a flow is between an entry and an exit region. Given n entry areas and m exit areas, the possible number of directional paths $F_i$ are n*m. Flow descriptors are constructed 26 by assigning individual tracks to an applicable directional path when its begin point and end point falls within the entry areas and exit areas, respectively, of the applicable directional path. Unassigned tracks may be discarded. Likewise, directional paths having only a few assigned tracks may be discarded so that the resulting flow descriptors are for the predominant traffic patterns. By repeating this process for different time periods, different flow descriptors can be developed for different times, such as different times of the day, different days of the week (e.g., weekdays vs. weekends), etc.

For each flow, the system can extract the average number of object detection events (in average how long each object spends on the flow) per flow. The measure of difference from the expected average will indicate the level of threat for an object. For example, an object is spending too much time on the flow (may be indicative of somebody is wandering around). For each obstacle region, the system can extract the average number of seconds (frames) during which an object would be behind the obstacle till the re-appearance on the possible flows. This extracted knowledge is used as to assign threat score to an object when the object is not re-appearing again. In addition to this information, each flow descriptor is comprised of a flow description, a temporal description and a confidence attribute. The flow description represents the directional motion flow in the camera's field of view. The temporal description denotes the time interval in which the flow is in effect and the confidence attribute is a quantitative measure of how reliable this knowledge is. The compilation of the flow descriptors defines a motion flow model for the camera which may be stored in its local data store.

Figure 3:
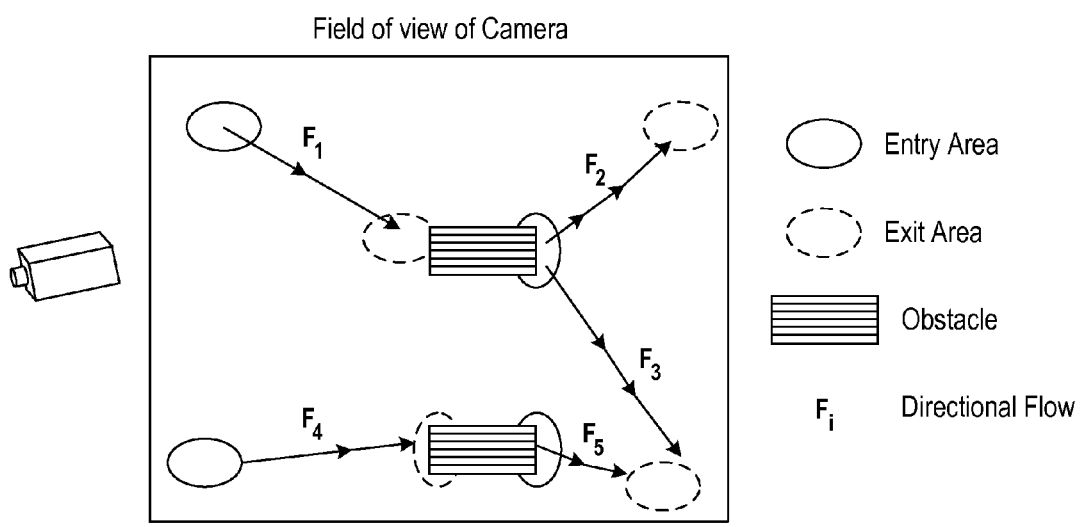
FIG. 3 is a diagram illustrating exemplary directional flows in the field of view of a camera.

Directional paths may be separated by obstacles which appear in the camera's field of view as shown in FIG. 3. Object matching may be used to associate two disjoint paths within the field of view of a camera. Briefly, when a camera detects an object, the camera can determine visual properties associated with the object. The camera can then look for the object along other directional paths within its field of view. For instance, when the camera detects an object moving along directional flow, $F_4$, it may look for that object to appear on directional flow $F_5$. When the camera detects the object moving along another path, it may form an associate between these two paths. Further details regarding object matching are provided below.

In the case two or more paths emerge from behind an obstacle (e.g., $F_2$ and $F_3$), the camera may assign a probability that an object will appear on a given path. Conditional probability is modeled for obstacle regions by using normal probability model. P(ObjectAppearsInEntryRegion='X'|ObjectDisappearedInExitRegion='Y' and ObjectWasOnFlow='F1') is an example probability model associated with the obstacle regions. The condition can be extended by utilizing other properties of objects, such as object type (car,person, etc), and velocity. The model can include the expected time of appearance. The model can also include that the object will not appear in any of the known flows.

Each camera is also configured to learn its associations with other cameras within the surveillance system (also referred to herein as camera association algorithm). Object matching is again used to determine associations between cameras. Object matching is based on a set of visual features of an object obtained by cameras. The match between different feature vectors can be represented by a weighted sum approach or Bayesian approach. Other matching approaches are also contemplated by this disclosure.

Each camera does not need to have the same set of feature extraction components. This is sometime due to the lack of availability of a homogenous camera system and sometimes (even when the cameras are exactly the same) the camera views are different (for example one camera is mounted to ceiling and looking down). In such configuration, some features cannot be reliably observed and it does not make sense to use such features in the matching algorithm. For example, the height measurement requires that the camera field of view has the ground plane. The height feature of an object obtained by a camera looking down from ceiling cannot be used. Thus, the weight of such feature should be set to 0. The matching algorithm is applied on the common feature vectors associated with an object. Some feature vectors, such as color descriptor, may be using different color spaces or quantization. Thus, the matching algorithm may need to normalize the feature vectors into common representation before comparison.

Visual descriptor of an object does not need to be obtained from the last observation/measurement. The some visual descriptor of an object also can be build by combining the last k number of observations. For example, assume that the camera extracts the color histogram (CIE LAB space) for the whole object, upper part of the object, and lower part of the object. Assume that the color feature vector of object in last k observations are FVt, FV(t−1), ..., FV(t−k+1). Then the weighted combination of feature vectors can be used as a descriptor at the current frame (t);

$$FV'_t = \sum_{i=0}^{k-1} w_i FV_{(t-i)}$$

where the $w_i$ denotes the weights associated with the past observations of visual feature descriptor. The weights can be fixed as well as associated with a decay function depending on the distance in the time dimension.

Exemplary features may include: a velocity model ($N_v(\mu, \sigma)$); color descriptors such as color histograms or MPEG7 Color Descriptors; texture descriptors, such as MPEG7 Texture Descriptors; shape descriptors, such as MPEG7 Shape Descriptors; height model ($N_{height}(\mu,\sigma)$); weight model; gait; and face descriptors, such as based on Gabor features and MPEG7 Face Descriptor. Some of these features are further described below. It is readily understood that other features are within the scope of this disclosure.

The velocity model of an object is build by using Gaussian probability model by using the instantaneous velocity observations. The distance between two models can be calculated by using Kullback-Liebler divergence or Jensen-Shannon divergence measure.

The height model of an object is build by using Gaussian probability model by using the instantaneous height measurements. The distance between two models can be calculated by using Kullback-Liebler divergence or Jensen-Shannon divergence measure.

The distribution of colors observed in an object is expressed by color histograms. Each bin represents a color and the value represents the frequency of such color in an object. For example, in RGB color space, one can use 8 bins for each color and obtains 8×8×8=512 bins and each bin represents a color interval in RGB space (3D representation) and these intervals may be variable length. There are many color spaces such as HSV (Hue-Saturation-Value). YCbCr, CIE Lab, etc. to build a color histogram. Particularly, color histogram in CIE Lab is more perceptually linear color space. The histogram can be obtained by using the 3 components (L,a,b) as well as only using a,b components by dropping the luminance component. The histogram representation by using only a and b channels of Lab color space likely to produce color descriptor that are less sensitive to illumination changes between cameras. The distance between color histograms can be calculated by using Lp distance, histogram intersection, quadratic distance, etc. methods. The Lp norm (Minkowski distance defined as);

$$D(f_1, f_2) = \left[\sum_{i=1}^{d} |f_1(i) - f_2(i)|^p\right]^{\frac{1}{p}}$$

for two vectors $(f_1, f_2)$ with d dimensions. L2 norm is when p=2 and knows as Euclidean distance, L1 norm is p=1 and known as city block distance.

Dominant color descriptor represents the distribution of salient colors in the region of interest. The distance between two descriptors, $F_1$ and $F_2$ is measured with L2 distance function $D(F_1, F_2)$ as;

$$F_1 = \{(c_{1i}, p_{1i}, v_{1i}), s_1\}, (i=1, 2, \ldots, N_1)$$

$$F_2 = \{(c_{2j}, p_{2j}, v_{2j}), s_2\}, (j=1, 2, \ldots, N_2)$$

where c denotes the dominant color value (a vector corresponding to color space components in given color space, for example in RGB color space, 3-D vector), N denotes the number of dominant colors. The percentage p is the fraction of pixels corresponding to color c and normalized value between 0 and 1

$$\left(\sum_i p_i = 1\right).$$

The color variance describes the variation of the color values of the pixels in a cluster around the corresponding representative color c. The spatial coherence s is a single number that represents the overall spatial homogeneity of the dominant colors.

$$D^2(F_1, F_2) = \sum_{i=1}^{N_1} p_{1i}^2 + \sum_{j=1}^{N_2} p_{2j}^2 - \sum_{i=1}^{N_1}\sum_{j=1}^{N_2} 2a_{1i,2j} p_{1i} p_{2j}$$

where F is dominant color descriptors. The parameter $a_{k,m}$ is the similarity coefficient between two colors $c_k$ and $c_m$, and $$a_{k,m} = \begin{cases} 1 - d_{k,m}/d_{max} & d_{k,m} \leq T_d \\ 0 & d_{k,m} > T_d \end{cases}$$

where $d_{k,m} = \|c_k - c_m\|$ is the Euclidean distance between two colors. Td is the maximum distance for two colors to be considered similar and $d_{max} = \alpha T_d$. For CIE-LUV color space, $10 \leq T_d \leq 20$ and $1.0 \leq \alpha \leq 1.5$. It is possible to define the distance measure that includes attributes of color variance and spatial coherence fields.

The homogeneous texture descriptor represents the region texture by using mean energy and the energy deviation from a set of frequency channels (each channel modeled using Gabor functions). The HTD contains $$HTD = [f_{DC}, f_{SD}, e_1, e_2, \ldots, e_{30}, d_1, d_2, \ldots, d_{30}]$$

where $f_{DC}$ and $f_{SD}$ are the mean and standard deviation of the region, $e_i$ and $d_i$ are the nonlinear scaled and quantized mean energy and energy deviation of the corresponding channel. The similarity is weighted sum of absolute difference between two sets of features.

The region-based shape descriptor represents the pixel distribution within a 2-D object or region. It uses 2D Angular Radial Transform. The distance is based on L1 norm. In contrast, the contour based shape descriptor uses Curvature Scale-Space representation of the contour. The similarity measure is based on weighted L1 norm.

Figure 4:
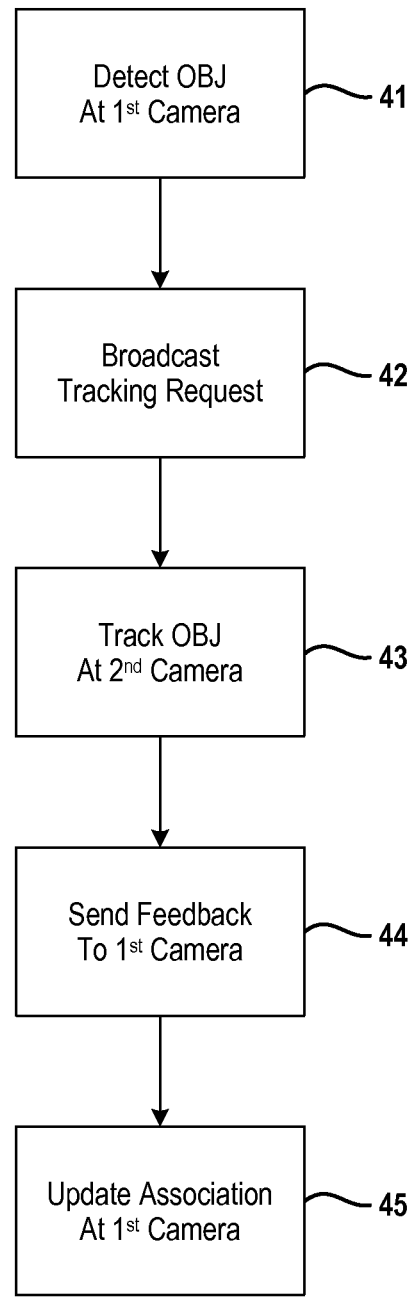
FIG. 4 is a flowchart illustrating an exemplary technique for a camera to learn its associations with other cameras in the system.

When a camera detects an object, the camera starts determining and accumulating properties of the detected object (i.e., properties are compiled as a set of feature vectors or attributes associated with an object) as indicated at 41 of FIG. 4. Upon approaching an exit area in the field of view of the camera, the camera sends a tracking request at 42 across the network to other cameras. For instance, the tracking request may be sent as a broadcast message as is known in many communication protocols. The tracking request message includes a unique identifier for the originating camera, an object identifier, an identifier for each flow traversed by the object, properties of the detected object, a time stamp, threat scores, and an expiration value (i.e., time-to-live TTL). In the case of a wireless network, the camera may use a location-aware messaging scheme to restrict where the tracking requests are sent in the network.

When a camera receives a tracking request, the camera begins searching for or tracking the requested object in its field of view as indicated at 43. In an exemplary implementation, a tracking entry is placed into a tracked object's list that is maintained by the tracking algorithm residing on the camera. If an entry in the tracked object's list already matches with the requested object, then the camera sends feedback message 44 back to originating camera to inform that the object is detected. This positive feedback message contains threat scores associated with an object. If requested object does not match any of the currently tracked objects, the camera puts an entry into the tracking list until TTL expires. If a matching object is detected before the expiration of the request, then the camera will also sends a feedback message back to the originating camera. Use of the expiration field allows cameras which do not have overlapping field of views can be associated with each other. An exemplary feedback message will contain an identifier for the responding camera, an object identifier, an identifier for each flow traversed in the field of view of the responding camera, a time of detection, threat scores, and confidence level of match. If a matching object is not detected (e.g., TTL expires), then camera removes this object definition from the tracked object list and no feedback message is provided to the originating camera. In an alternative implementation, a feedback massage may be sent even when a matching object is not found if the tracking message requires that the feedback is needed.

When a camera receives a feedback message from another camera, the camera may form or update an association 45 with the responding camera. In a simple example, the originating camera forms an associate with a responding camera upon receipt of any feedback message from the responding camera. Alternatively, the originating camera may form the associate when the confidence level of a match as reported in the feedback message exceeds some predefined threshold.

To construct a more detailed topology, the originating camera may form an associated between a particular flow path in its field of view and a particular flow path in the field of view of the responding camera. In an exemplary embodiment, each camera keeps two kinds of information about the flows between cameras: where (in which camera) an object will re-appear if an object is in a given flow within the camera? and where (in which camera) an object was if an object is detected in an entry region of camera?

To learn in which camera an object will re-appear, each camera keeps a list of the records for each flow (flow_id). Each record contains the following attributes:

| Attribute | Description |
|---|---|
| Camera Id | Camera Identifier |
| entryRegionIdInCamera | Entry Region Identifier in camera |
| flowIdInCamera | Flow Identifier in camera |
| probabilityOfAppearance | Probability of Appearance of the object on this camera on this flow |
| numberOfSamples | Number of samples used |
| $\mu_{\Delta t}$ | Expected time to appear (average) |
| $\sigma_{\Delta t}$ | Standard deviation of average appearance time |
| TS | Time stamp (keep track of the update on lastNResults) |
| lastNResults | % of failure in last N requests |

To learn where an object could be before it appeared in an entry region, each camera also maintains another list for each entry region in its field of view. Each record in this list includes: a camera identifier, a flow identifier, an exit region identifier, and a probability it was there (i.e., a % of inflows from different exit regions in other cameras to a entry region). This information is easily captured in the messaging scheme described above.

Let's assume obj_x following flow f1 disappeared from the field of view of camera-1. When camera-1 receives feedback message for obj_x from camera_y, this feedback message at least contains a camera identifier (for camera_y), an entry region identifier in camera_y, a flow identifier in camera_y, a confidence of match, and timestamp. Assuming that the confidence value is larger than a threshold (90%), this feedback acknowledges that the appearance of obj_x in camera_y. Camera-1 can then proceed as follows. First, a counter that tracks number of objects disappeared on flow f1 is incremented. Next, a search is performed for an entry {f1,camera_y,entryRegionId} in the associations table. Update the number of observations in the entry by incrementing the number of samples attribute. If no entry is found, then a new entry is added to the associations table with current time stamp, flow identifier as f1, camera identifier as camera_y, number of observations as 1, probability (p) as 0. Lastly, probability values for each row that has f1 as a flow are re-evaluated based on the current feedback message. Special camera identifier (−1) denotes that the object did not appear in any camera or the confidence was below average. Thus, the special row (f1,camera_id=−1) tracks such observations and their occurrence probabilities. In this way, an originating camera may also form associates based upon a series of feedback messages for different objects.

Since usage patterns will change over time, cameras are further configured to re-learn its associations. For instance, a camera may periodically broadcast tracking requests to confirm its associations. Alternatively, when a camera detects it is no longer receiving feedback from an associated camera, it may re-initiate the learning process.

Figure 5:
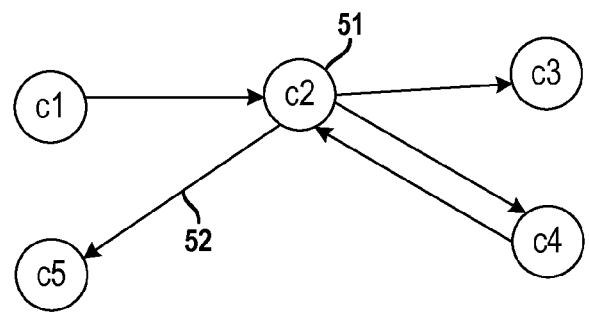
FIG. 5 is a diagram of a directed graph used to represent associations between cameras.

Camera associations may be defined using directed graphs as shown in FIG. 5. Each node 51 in the graph corresponds to a camera or, alternatively, to a flow path: whereas, each edge 52 in the graph corresponds to an association between cameras or between flow paths, respectively. Each association may further denote a confidence level for the association. Other techniques for representing the camera associations are also contemplated by this disclosure. In any case, associations between an originating camera and other cameras are maintained in a local data store associated with the originating camera.

Figure 6:
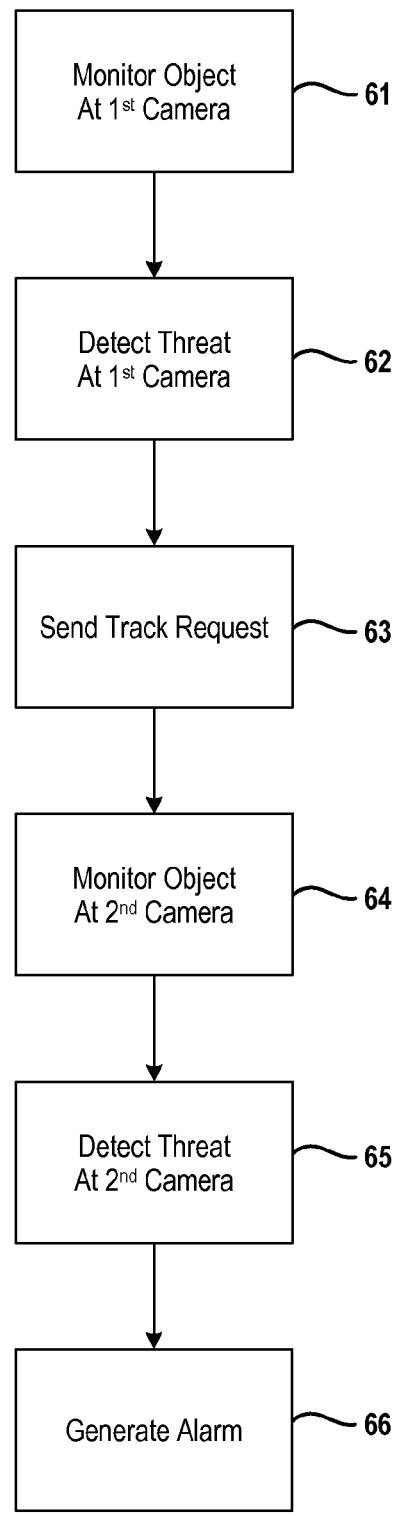
FIG. 6 is a flowchart illustrating a method for detecting a threat across multiple cameras in a distributed surveillance system.

A method for detecting a threat in a distributed multi-camera surveillance system is further described below in relation to FIG. 6. By learning the motion flows in its observation area, a camera builds temporal motion flow models for its observed scene. When a detected object does not conform to the learned flow model (i.e. detects a threat or abnormality), the camera may generate an alarm. This approach is superior to the directional VMD configurations. For example, a camera observing an entrance of building is able to learn that, in the morning hours the flow is from north to south and in the evening hours the flow is from south to north since people leave the building. These exemplary flows are generalized for easy of understanding. The number of flows depends on the scene observed by the camera.

Moreover, associated cameras can work together to detect threats without the involvement of a central server. Upon detecting a threat, an originating camera sends a tracking request to one or more associated cameras. Tracking request contains scores (that are assigned to an object) from individual scoring algorithms applied by the originating camera. An exemplary scoring algorithm is provided in the appendix below. Other exemplary scoring algorithms may be found in U.S. patent application Ser. No. _____ filed concurrently herewith and entitled "Surveillance Systems and Methods" which is incorporated herein by reference. These and other scoring algorithms are within the scope of this disclosure. Thus, the threat score is passed along in the tracking request to assist other cameras in evaluating the threat.

Rather than flooding the network with unnecessary messages, the tracking request is only sent to associated cameras. In a preferred embodiment, the tracking request may be sent only to cameras associated with the exit area in which tracked object was last observed. Upon receiving a tracking request, the camera begins searching for or tracking the requested object in its field of view in the manner described above.

Figure 7:
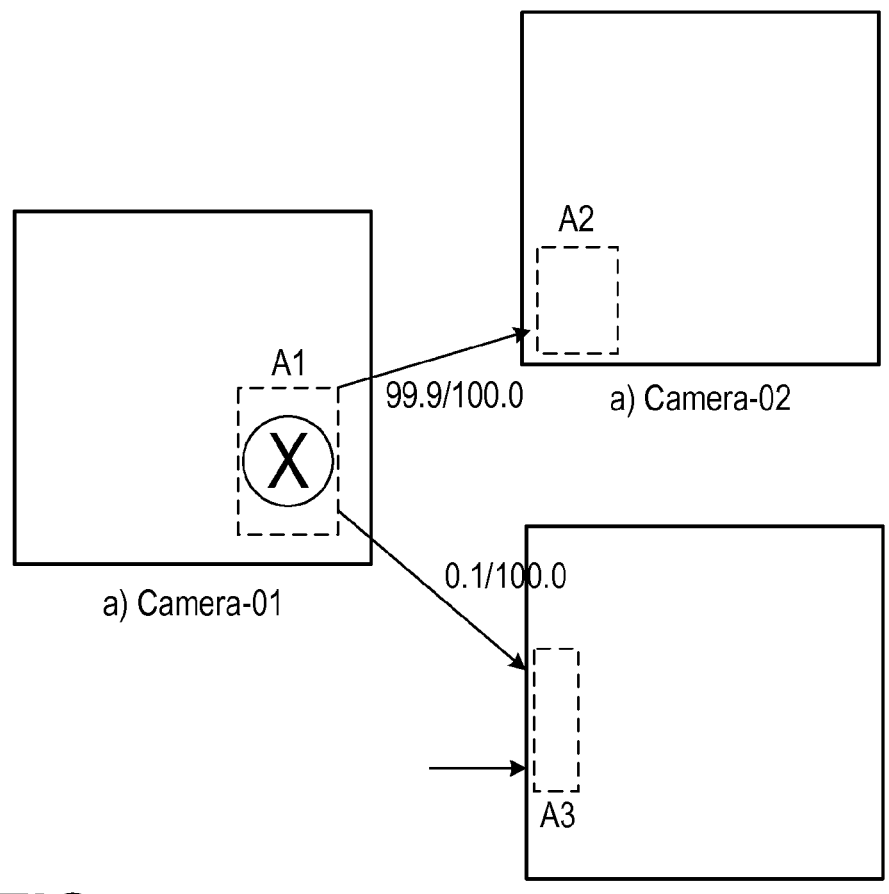
FIG. 7 is a diagram depicting threat detection across multiple cameras.

When the movement of the tracked object does not conform with the motion flow model of a second camera, the second camera may generate an alarm. In FIG. 7, the camera- 03 detecting an object X in entry area A3 is an expected event. But, the detecting an object coming from exit region A1 in camera-01 is quite rare. The motion cannot be flagged as suspicious by camera-03 and camera-01 since (for both) stand-alone observations are quite normal. What makes this a threat in camera-03 is that the object X has been appeared in camera-01 before. Aggregation of threat level for an object in the second camera builds on top of the threat score obtained from the previous camera. The combination can be weighted average with or without time dependent time decay values.

Figure 8:
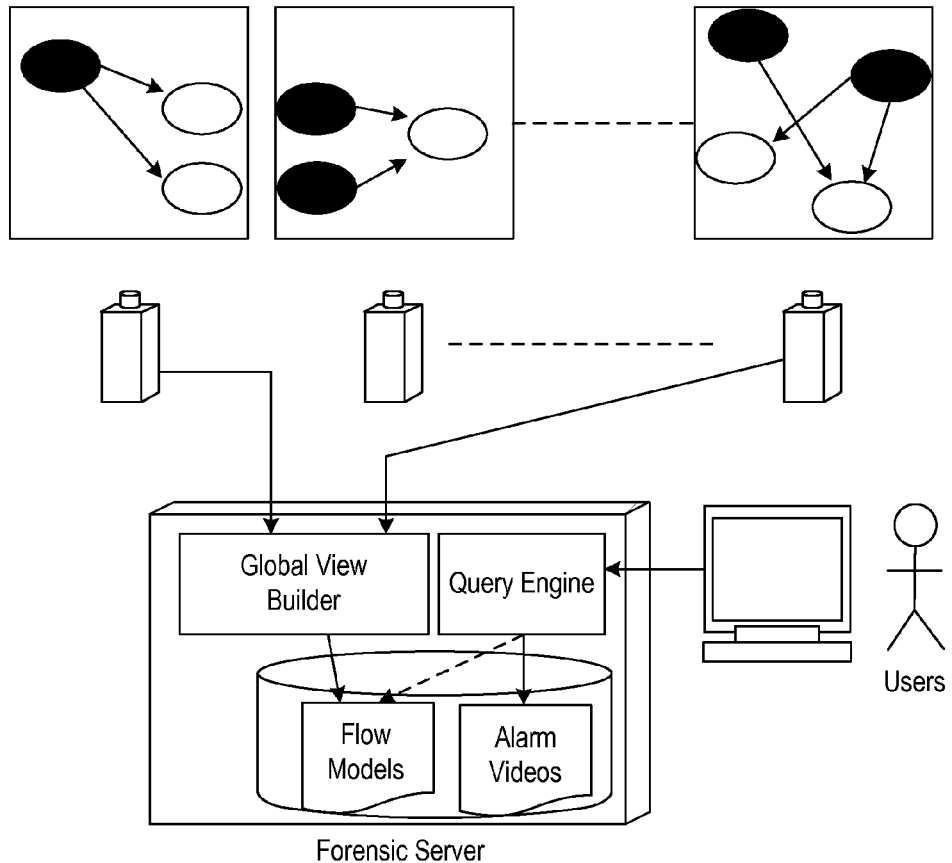
FIG. 8 is a diagram depicting a remote monitoring station interconnected to a multi-camera surveillance system.

The distributed multi-camera surveillance system may also be interconnected to a remote monitoring station as shown in FIG. 8. The remote monitoring station is generally comprised a video server and a plurality of video monitors for viewing the video data captured throughout the surveillance system. It is understood that the number of video monitors is less than the number of camera and that video data from different camera is typically displayed in accordance with some predefined sequence.

The video server at the remote monitoring station further includes a global view builder, a query engine and a data store. The global view builder is responsible for collecting learned camera associates from each of the cameras and building a global camera association.

The global view builder may learn the camera associates from the distributed cameras in different ways. For instance, each camera may support an application programming interface (API) that allows an external module (such as the global view builder) to pull learned camera associations from the camera. Although other data formats are contemplated, the camera associations may be represented using the Predictive Model Markup Language. The global view builder may then periodically query the API to retrieve the camera associates residing on each camera. In another instance, each camera supports an API that allows an external module to configure a notification endpoint (such as a port number, HTTP address, multicast address, etc.) to report when the learned associations have changed. In this way, the global view builder may receive updates when camera associates have changed.

Figure 9:
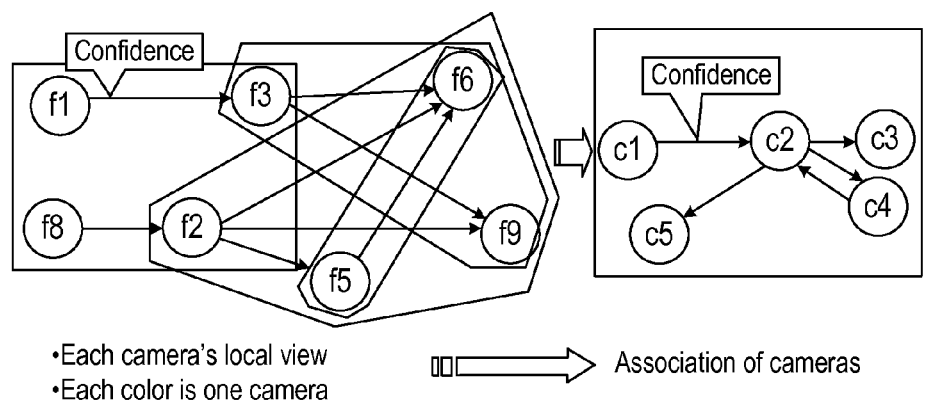
FIG. 9 is a diagram depicting how the global view builder deducts camera associations from an exemplary collected local view.

Given the camera associations as reported by each of the cameras, the global view builder can construct a global view of the network. FIG. 9 illustrates how the global view builder deducts camera associations from an exemplary collected local view. Let's assume that the global view builder has collected the following records from each camera: flowid, exitRegionId, {cameraid, entryRegionIdInCamera, flowId-InCamera, probabilityOfAppearance, numberOfSamples, TS, lastNResults}. For each camera, extract cameraid(i) and probabilityOfAppearabce[i]. In the list of (camera[],probabilityOfAppearabce[]), combine (add) the probability attribute values when cameraid[] is the same for $i^{th}$ and $j^{th}$ element. For each unique camera identifier, there is only one probability value. Normalize the probability value by using the sum of probability values. This algorithm produces the camera-camera associations. Special camera id value (such as −1) is used for objects does not appear in any known camera.

Figure 10:
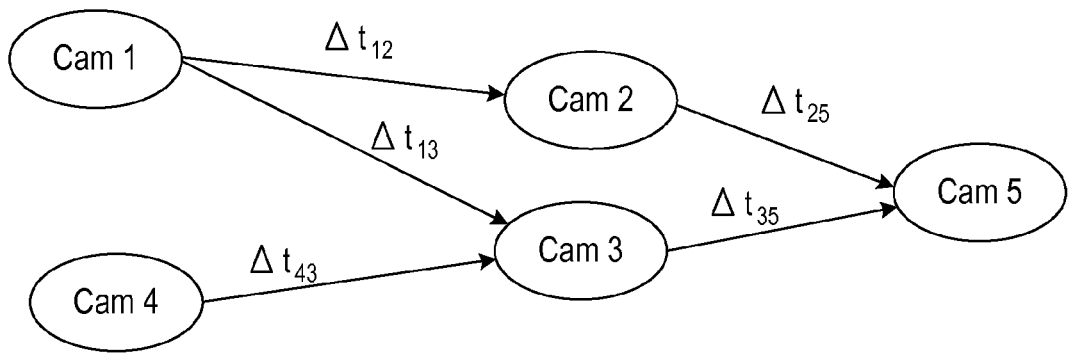
FIG. 10 is a directed graph for an exemplary camera association constructed by the global view builder.

The camera associates are preserved as directed graphs. An exemplary directed graph is shown in FIG. 10. Each vertex in the graph contains a camera identifier. Each edge in the graph denotes a confidence measure for the associate and an average time delay for objects moving between the field of views of the associated cameras. The $\Delta t$ value is obtained from $\mu_{\Delta t}$ and $\sigma_{\Delta t}$ in combination with the sample size (addition of two mean value require sample size to get a reliable value).

When an alarm is reported by one of the cameras to the central monitoring station, the reporting camera may also provide the video file that is associated with the alarm. In other words, the video data which shows the object that caused the alarm condition. When the alarm was based on observations by multiple cameras, then the reporting camera may also send messages to each of the other cameras which observed the suspicious object. These observing cameras may in turn send video data which shows the suspicious object to the monitoring station. In this way, video data associated with an alarm condition is reported to the monitoring station. The video data may be stored for subsequent query at the video server of the monitoring station and/or may be immediately displayed (along with other operator indicators) on one of the monitors residing at the monitoring station.

In lieu of or in addition to real-time reporting of alarm conditions, video data from each camera may be archived at the remote monitoring station. Video data or portions of video data from each camera is periodically retrieved and stored at the remote monitoring station. Archived video data from different camera may be queried by the query engine in the manner further described below.

For example, an operator is aware of an approximate time an event that occurred at a location which is in the field of view of a particular camera. The operator formulates a search query for this event and submits the query to the query engine. For instance, search for video files taken by the particular camera during a specified time period (i.e., between $t_{begin}$ and $t_{end}$). When the time period is quite large (e.g., a few hours or a few days), multiple video files may meet the search criteria. Given a search query, the query engine first retrieves all of the video files which meet the search criteria.

Figure 11:
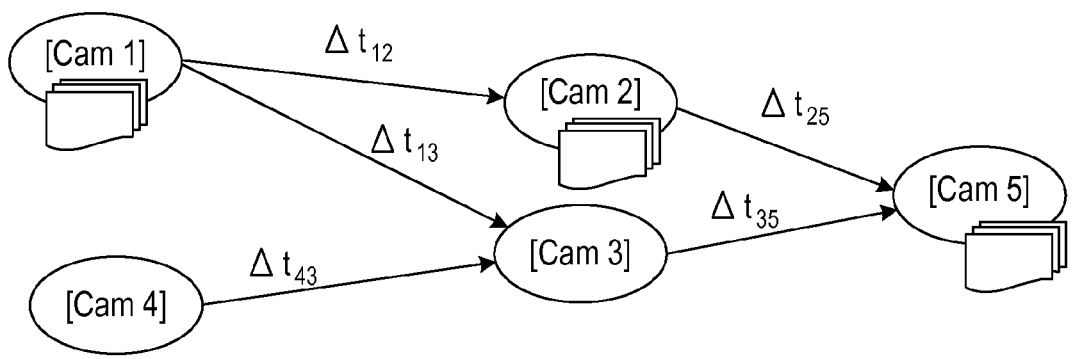
FIG. 11 illustrates how a query operation may be displayed in a graphical representation.

The query engine can then search for video files from other cameras. Cameras associated with the particular camera are learned from the directed graphs constructed by the global view builder. A new set of queries can be executed for each of the associated cameras. The specified time period for each query will be adjusted based on the average time delay between the cameras as denoted on the graph. For example, if the average time delay is $\Delta t_{12}$, then the specified time period for the query is $(t_{begin}+\Delta t_{12}) < ts < (t_{end}+\Delta t_{12})$. The query operation may be displayed in a graphical representation as shown in FIG. 11. Each vertex contains a set of videos for camera, but otherwise is the same of the camera association directed graph.

In the case of a query with a large time window, further correspondence between video files at each node needs to be established. In one example, correspondence can be established by using temporal relationships. In another example, correspondence can be established between videos using additional visual features. For example, face vectors associated with each person detected in a video file can be used to link videos from different cameras.

Finally, the videos are ordered in time axis and a synchronized video playback is returned as the search result by the query engine. In an exemplary embodiment, Synchronized Multimedia Integration Language (SMIL) is used to synchronize the video playback. Other synchronization techniques are contemplated by this disclosure.

Figure 12A:
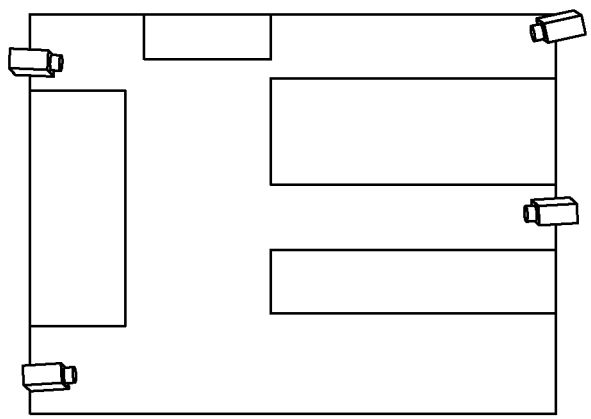
FIGS. 12A and 12B illustrate how query results may be presented in the context of a 2-D floor plan.
Figure 12B:
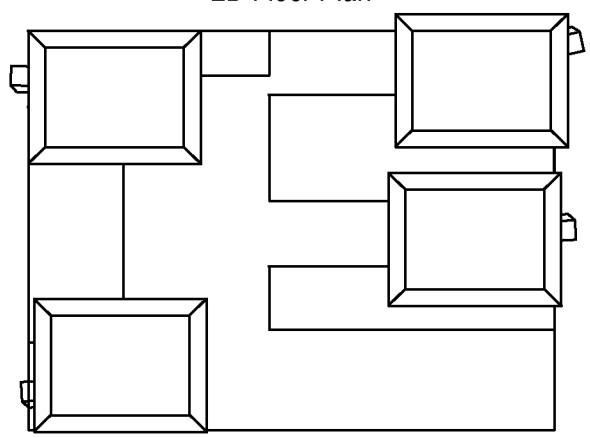

FIGS. 12A and 12B illustrate how the videos may be played in relation to a two-dimensional floor plan. FIG. 12A depicts the floor plan of an area under surveillance by multiple cameras. In FIG. 12B, a playback window is provided for each camera in the floor plan. The videos will start playing according to a specified playback time. Thus, videos from multiple camera can play simultaneously giving insight to alarm event.

The above description is merely exemplary in nature and is not intended to limit the present disclosure, application, or uses.

Appendix

Exemplary Scoring Algorithm:

Compare the current occurrence probability associated with current location of an object with the mean value of occurrence probabilities obtained from last 3 time slices. When the occurrence probability associated with the current location of an object is less than the mean value of occurrence probabilities, the algorithm assigns abnormality score by using the distance from the mean value.

Input: $\bar{o}$=[oid,t,x,y]
Output: Threat Score in [0 . . . MAX_THREAT_SCORE]
Calculation of combined occurrence model for $\bar{o}$=[oid,t,x,y]
Select Occurrence Time slices for (t−2), (t−1), and t from data cube $(O_{(t-2)}, O_{(t-1)}, O_t)$ $$\text{CombinedOccurence} = O_{(t-2)} + O_{(t-1)} + O_t;$$

Calculation of mean occurrence probability for $\bar{o}$=[oid,t,x,y]
Find the mean value of non-zero entries from CombinedOccurence

```
Function [isThreat ThreatScore] = SE_ALG1(DC,o)
QuantizationValue = meanValue/(MAX_THREAT_SCORE-1)
isThreat=0;
ThreatScore=0;
If CombinedOccurence(x,y,t)>meanValue then
   ThreatScore=0; // No threat
else
   isThreat=1;
   ThreatScore=floor(CombinedOccurence(x,y,t)/QuantizationValue)+1;
end
```

What is claimed is:

1. A distributed multi-camera surveillance system, comprising: a plurality of cameras including: a first camera having a field of view and an associated data store for storing a trained statistical motion flow model for objects moving in the field of view of the first camera, the model based on observed motion vectors within the first camera's field of view in combination with feedback data compiled and communicated peer-to-peer to the camera by another camera in response to a tracking request issued by the first camera, the tracking request message communicating time stamp and flow identifier information associated with a trained statistical motion flow, and the feedback data received by said another camera communicating matching time stamp and corresponding flow identifier information that is used by the first camera to dynamically learn a topological relationship between the first camera and said another camera, wherein the motion flow model is a building algorithm embodied in software installed at each of the individual cameras of the plurality of cameras for constructing the motion flow model for their own independent fields of view and wherein the dynamic learning of the topological relationships between the cameras includes each individual camera dynamically updating its statistical model, in real-time, upon the receiving of the dynamically transmitted tracking requests transmitted by the other individual cameras, such that the individual cameras are able to dynamically and individually adapt to their individual orientations and positions; the system further including: the first camera operable to detect a threat when movement of an object in its field of view does not conform to the motion flow model and transmit a tracking request for the object over a network to a second camera; and the second camera having a field of view and an associated data store for storing a motion flow model for objects moving in the field of view of the second camera, the second camera operable to detect a threat when movement of an object in its field of view does not conform to the motion flow model and generate an alarm based on the threat detected at the first and second cameras.

2. The surveillance system of claim 1 further comprises a tracking algorithm embodied in software installed at the first camera for monitoring movement of objects in its field of view.

3. The surveillance system of claim 1 further comprises a camera association algorithm embodied in software installed at the first camera for learning associations with other cameras in the system.

4. The surveillance system of claim 1 further comprises a threat detection algorithm embodied in software installed at the first camera for comparing object movements to the motion flow model.

5. The surveillance system of claim 1 wherein the motion flow model residing at the first camera defines directional paths for objects moving in the field of view of the first camera.

6. The surveillance system of claim 1 further comprises a remote monitoring station connected to the network and adapted to receive the alarm generated by the second camera.

7. A method for detecting a threat in a distributed multi-camera surveillance system, comprising: a plurality of cameras including: training a statistical motion flow model of a first camera based on observed motion vectors within the first camera's field of view in combination with feedback data compiled and communicated peer-to-peer to the camera by another camera in response to a tracking request message issued by the first camera, the tracking request message communicating time stamp and flow identifier information associated with a trained statistical motion flow, and the feedback data received by said another camera communicating matching time stamp and corresponding flow identifier information that is used by the first camera to dynamically learn a topological relationship between the first camera and said another camera; wherein the motion flow model is a building algorithm embodied in software installed at each of the individual cameras of the plurality of cameras for constructing the motion flow model for their own independent fields of view and wherein the dynamic learning of the topological relationships between the cameras includes each individual camera dynamically updating its statistical model, in real-time, upon the receiving of the dynamically transmitted tracking requests transmitted by the other individual cameras, such that the individual cameras are able to dynamically and individually adapt to their individual orientations and positions; the system further including: monitoring movement of an object in a field of view of the first camera using software installed at the first camera that accesses the statistical motion flow model of the first camera; detecting a threat at the first camera when movement of the object does not conform with a motion flow model residing at the first camera; using said tracking request message for the object from the first camera to a second camera upon detecting the threat at the first camera; monitoring movement of the object in a field of view of the second camera using software installed at the second camera; detecting a threat at the second camera when the movement of the object does not conform with a motion flow model residing at the second camera; and generating an alarm based in part on the threat detected at the first camera and the second camera.

8. The method of claim 7 wherein building the motion flow model further comprises:

defining tracks for objects moving in the field of view of the first camera using an object tracking algorithm;

determining entry areas and exit areas in the field of view of the first camera by applying a clustering algorithm to beginning points and end points of the tracks;

defining directional flows between the entry areas and the exit areas; and assigning each track to a directional flow using a begin point and an end point associated with a given track.

9. The method of claim 7 further comprises learning motion flow of objects between the first camera and other cameras in the system, and storing camera associations in a data store at the first camera.

10. The method of claim 7 further comprises:

assigning a threat score for the object detected at the first camera;

sending the threat score in the tracking request from the first camera to the second camera; and generating the alarm based in part on the threat score from the first camera.

11. The method of claim 7 further comprises assigning threat scores to the object detected at the second camera and generating the alarm based on the threat scores associated with the threat detected at the first and second cameras.

12. The method of claim 7 wherein generating an alarm further comprises sending an alarm message from the second camera to a remote monitoring location.

13. The method of claim 12 further comprises sending video data showing the object in a field of view of the first camera from the first camera over the network to the remote monitoring location and sending video data showing the object in the field of view of the second camera from the second camera over the network to the remote monitoring location.

14. The method of claim 7 further comprises:

sending a tracking request from the second camera to a third camera upon detecting the suspicious object at the second camera;

monitoring movement of the object in a field of view of the third camera using software installed at the third camera; and generating an alarm when the movement of the object does not conform with a motion flow model residing at the third camera.

15. A method for learning motion flow of objects amongst two or more cameras in a distributed multi-camera surveillance system, comprising: training a statistical motion flow model of a first camera based on observed motion vectors within the first camera's field of view in combination with feedback data compiled and communicated peer-to-peer to the camera by another camera in response to a tracking request message issued by the first camera, the tracking request message communicating time stamp and flow identifier information associated with a trained statistical motion flow, and the feedback data received by said another camera communicating matching time stamp and corresponding flow identifier information that is used by the first camera to dynamically learn a topological relationship between the first camera and said another camera; detecting an object moving in a field of view of a first camera using software installed at the first camera that accesses the statistical motion flow model of the first camera; wherein the motion flow model is a building algorithm embodied in software installed at each of the individual cameras of the plurality of cameras for constructing the motion flow model for their own independent fields of view and wherein the dynamic learning of the topological relationships between the cameras includes each individual camera dynamically updating its statistical model, in real-time, upon the receiving of the dynamically transmitted tracking requests transmitted by the other individual cameras, such that the individual cameras are able to dynamically and individually adapt to their individual orientations and positions; the system further including: using said tracking request message from the first camera across a network to other cameras in the network, wherein the tracking request provides an identifier for the first camera, an identifier for the object and visual attributes associated with the object; searching for the object in a field of view of a second camera in response to the tracking request received from the first camera; and associating the second camera with the first camera when the object is detected in the field of view of the second camera.

16. The method of claim 15 further comprises searching for the object at the second camera during a window of time defined in the tracking request.

17. The method of claim 15 further comprises sending a message from the second camera to the first camera when the object is detected in the field of view of the second camera and associating the second camera with the first camera based on the message.

18. The method of claim 17 further comprises sending a subsequent tracking message from the first camera to the second camera based on the associate between the two cameras.

19. The method of claim 15 further comprises maintaining a confidence metric regarding the associate of the first camera with the second camera at the first camera and updating the confidence metric upon receipt of the message sent by the second camera to the first camera.

20. The method of claim 15 further comprises sending a message which includes a confidence measure that the detected object correlates to the object detected by the first camera from the second camera to the first camera.

21. The method of claim 15 further comprises receiving feedback messages at the first camera from multiple cameras, where each feedback message includes a confidence measure that the object detected by a given camera correlates to the object detected by the first camera, and associating the first camera with one of the multiple cameras based on the confidence measures.

22. The method of claim 15 further comprises reporting the associate between the first and second cameras to a remote monitoring location.

23. The method of claim 15 further comprises retrieving the associate between the first and second cameras from the first camera by a remote monitoring location.

24. The method of claim 15 further comprises learning where an object traversing a given flow in the field of the first camera will re-appear in the system.

25. The method of claim 24 further comprises maintaining a record in a list for each location the object re-appears and updating a probability the object appeared at each location based on feedback messages received from other cameras in the system.

26. The method of claim 15 further comprises learning where an object was prior to appearing in an entry region of its field of view.

27. The method of claim 26 further comprises maintaining a record in a list for each location the object was and updating a probability the object came from each location based on feedback messages received from other cameras in the system.

28. The surveillance system of claim 1 wherein said tracking request message communicates to the second camera intermediate accumulative threat scores, calculated by the first camera to enable continued calculation of the threat score based on the second camera's own assessment and based on threat scores of another camera.

29. The surveillance system of claim 1 wherein the second camera in turn passes back the accumulative threat scores to the first camera in the event an object moves back into the field of view of the first camera.

* * * * *